C. L. SPEIGHT.
PULLEY.
APPLICATION FILED MAY 7, 1912.
1,122,324.
Patented Dec. 29, 1914.
2 SHEETS—SHEET 2.
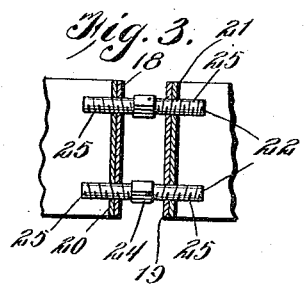
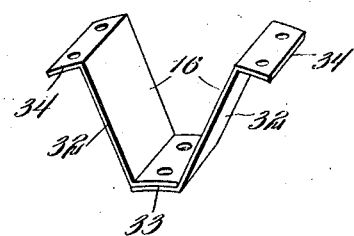
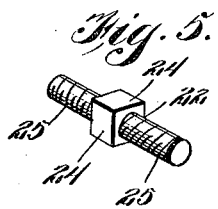
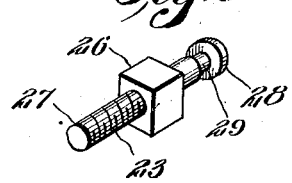
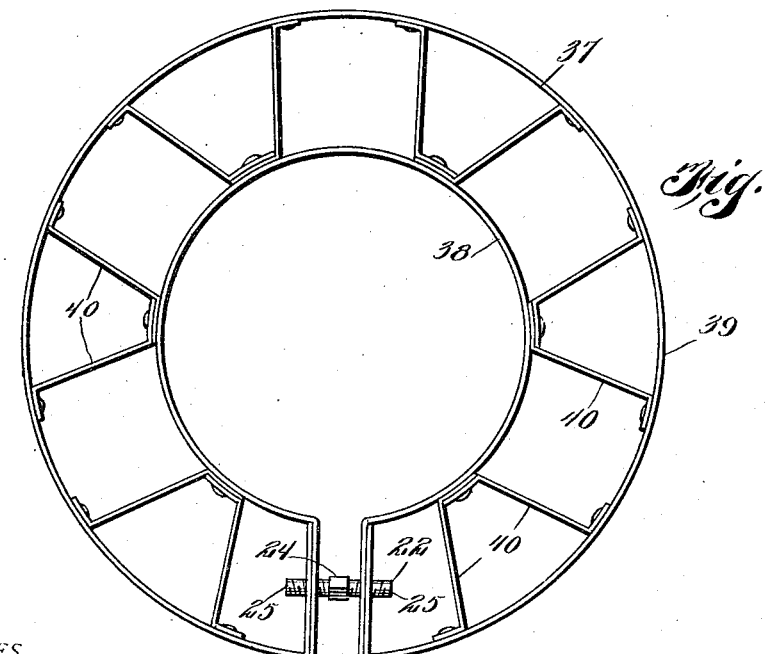
WITNESSES
INVENTOR
Charles L. Speight
Attorney.

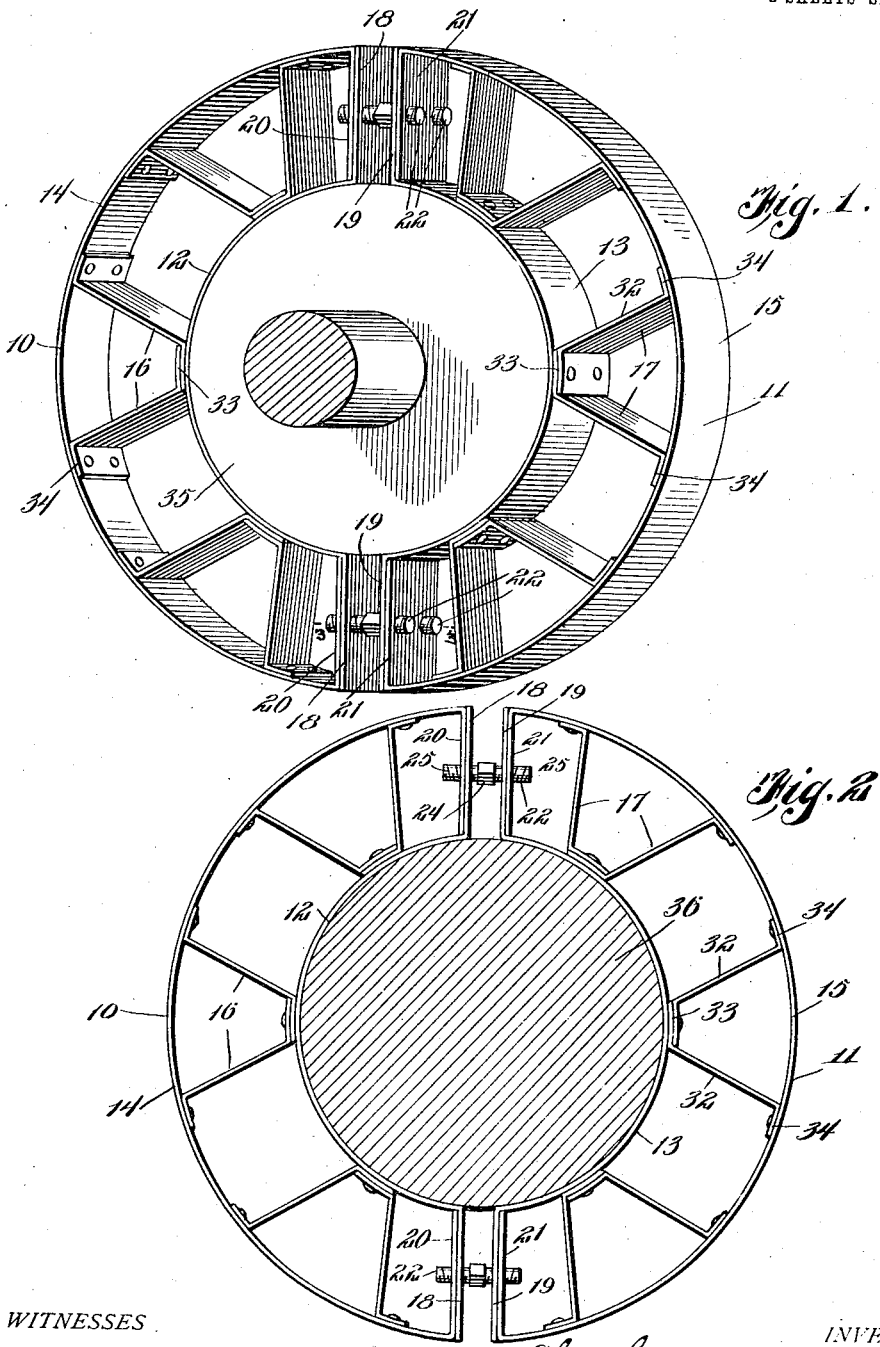

UNITED STATES PATENT OFFICE.

CHARLES L. SPEIGHT, OF CLARION, IOWA.

PULLEY.

1,122,324.   Specification of Letters Patent.   Patented Dec. 29, 1914.

Application filed May 7, 1912. Serial No. 695,630.

*To all whom it may concern:*

Be it known that I, CHARLES L. SPEIGHT, a citizen of the United States, residing at Clarion, in the county of Wright and State of Iowa, have invented certain new and useful Improvements in Pulleys, of which the following is a specification.

The invention relates to pulleys and has for an object to provide a pulley in which the diameter thereof can be conveniently increased or decreased.

The invention embodies among other features a device particularly adapted for use in connection with shafting and pulley bodies, whereby the contact surfaces of the pulley can be increased or decreased to accommodate the pulley for shafting or pulley bodies of different diameters and also increase or decrease the peripheral working surface of the pulley.

In the further disclosure of the invention reference is to be had to the accompanying drawings, constituting a part of this specification, in which similar characters of reference denote corresponding parts in all the views, and in which:

Figure 1 is a perspective view of my device, showing the same used in connection with a pulley body. Fig. 2 is a vertical sectional view, showing the device secured directly to shafting. Fig. 3 is a fragmentary sectional view taken on the line 3—3 of Fig. 1. Fig. 4 is a perspective view of one of the supporting members. Fig. 5 is a perspective view of one form of adjusting member used in connection with my device. Fig. 6 is a perspective view of another form of adjusting member, and Fig. 7 is a vertical sectional view of a modified form of my device.

Referring more particularly to the views I employ a plurality of connectible sections 10, 11, embodying semicircular hub members 12, 13 and semicircular rim members 14, 15, supported on the hub members 12, 13 by supporting members 16, 17 respectively. The ends 18, 19 of the respective hub members 12, 13 are bent outwardly in parallel relation, the ends 20, 21 of the respective rim members 14, 15 being bent inwardly with the outer faces of the ends 20, 21 abutting against and suitably secured to the outer faces of the ends 18, 19 of the hub members 12, 13. Adjusting members 22, 23, shown in Figs. 5 and 6 respectively, are provided for securing the sections 10, 11 and for relatively adjusting the same. The member 22 consists substantially of a squared head 24 having threaded shanks 25 extended from both ends thereof, one of the shanks having right hand threads and the other left hand threads. The member is mounted to have threaded connection with the adjacent ends of the respective sections 10, 11, the squared shank being positioned between the sections so that a suitable wrench can be inserted between the ends of the sections to engage the squared head for the purpose of operating the member 22 to relatively adjust the said sections. The adjusting member 23 embodies a squared head 26, a threaded shank 27 extended from one end thereof and a shoulder 28 extended from the other end of the head 26, a circular reduced portion 29 being formed between the head 26 and shoulder 28 so that when the adjusting member 23 is employed in connection with the sections 10, 11, the shank 27 will have threaded engagement with an end of one section while the adjacent end of the other section will be received on the reduced portion 29, the squared head 26, being interposed between the adjacent ends of the sections 10, 11, so that a wrench can be conveniently inserted between the adjacent ends to engage the head 26 for the purpose of operating the member 23 to relatively adjust the sections 10, 11.

The series of relatively spaced supporting members 16, 17 are interposed between the hub members 12, 13 and the rim members 14, 15, respectively, the said supporting members being provided to support the rim members 14, 15 on the respective hub members 12, 13, and each consisting of a plurality of angular plates 32, terminating at their ends in ears 33, 34, the ears 33 of the plates being jointed and rigidly secured to the hub members 12, 13 and the ears 34 of the plates being spaced apart and rigidly secured to the rim members 14, 15. It will thus be seen that each supporting member is substantially V shaped, the said supporting members being provided to support the inner members 14, 15, as mentioned heretofore and also adapted to retain the rim members in equidistantly spaced relation to the hub members 12, 13.

Referring to Fig. 1 it will be seen that when my device is employed in connection with a pulley body 35, the sections 10, 11 are arranged to encircle the periphery of the pulley body, after which the sections are secured in the desired adjusted position by the use of one of the forms of adjusting members disclosed in Figs. 5 and 6, it being readily apparent that by connecting the sections 10, 11 in the manner mentioned heretofore, the peripheral surfaces of the sections can be substantially increased or decreased in proportion to the peripheral surface of the pulley body 35, the inner faces or surfaces of the hub members 12, 13, being in engagement with the peripheral surface of the pulley body 35.

Referring to Fig. 2 it will be seen that my device can also be employed in connection with shafting, the device in this instance being directly mounted on a shaft 36, with the inner surfaces or faces of the hub members encircling the peripheral surface of the shaft.

In Fig. 7 I disclose a modified form of my device and in which I employ a single section 37, instead of a plurality of similar sections 10, 11, disclosed in Figs. 1 and 2, the mentioned single section, however, being similar in construction to the sections 10, 11 and applicable to a pulley body or shafting in a similar manner. The section 37 consists of an inner or hub member 38, an outer or rim member 39 and supporting members 40, similar to the supporting members 16, 17, the said supporting members 40 being provided to support the rim member 39 on the hub member 38, adjusting members, similar to the members disclosed in Figs. 5 and 6, being preferably employed to adjustably connect the ends of the section 37.

It will, of course, be understood that the coacting pairs of braces or supporting members 16—16, 17—17 or 40—40 may be integral with each other, that is, each pair of braces or supporting members may be in the form of a single V-shaped or U-shaped piece, an obvious modification falling within the spirit of the invention.

From the foregoing description it will be seen that in the two forms of my device I provide a construction whereby the device can be used with a pulley body or directly secured to a shaft and whereby the diameter, and consequently the peripheral working surface of the device, can be conveniently and positively increased or decreased, thus also causing a corresponding increase or decrease in the diameter of the sections or section to enable the device to be mounted on a suitable pulley body or shaft.

Having thus described the invention what I claim as new, is:—

1. An adjustable pulley including a hub-member formed from a flat sheet of metal and a rim-member also formed from a flat sheet of metal and surrounding the hub and arranged concentric thereof, each of the said members having oppositely disposed angular ends providing overlapping members that lie one against the other and terminate with the peripheral faces of the respective members and space the said members, angular supports arranged in pairs between and secured to the said members, bolt members having central heads disposed between the opposite pairs of lapping members providing the ends of the pulley and co-engaging with the said members to retain the same one against the other as well as to move the ends of the pulley toward or away from each other to adjust the pulley and sustain the same at such adjustment.

2. An adjustable pulley including a hub-member and a rim-member, each of said members having oppositely disposed angular ends which overlap and terminate with the peripheral faces of the respective members to space the rim from the hub, supports connecting the rim and hub between the ends thereof, bolts arranged between the adjacent ends of the members, each of said bolts being rotatably connected with the overlapping members providing one of the ends, the said bolts adjustably engaging the opposite overlapping members at the second end, and a head arranged medially of each of the bolts.

In testimony whereof I affix my signature in presence of two witnesses.

CHARLES L. SPEIGHT.

Witnesses:
U. B. TRACY,
F. W. WALKER.

Copies of this patent may be obtained for five cents each, by addressing the "Commissioner of Patents, Washington, D. C."